UNITED STATES PATENT OFFICE.

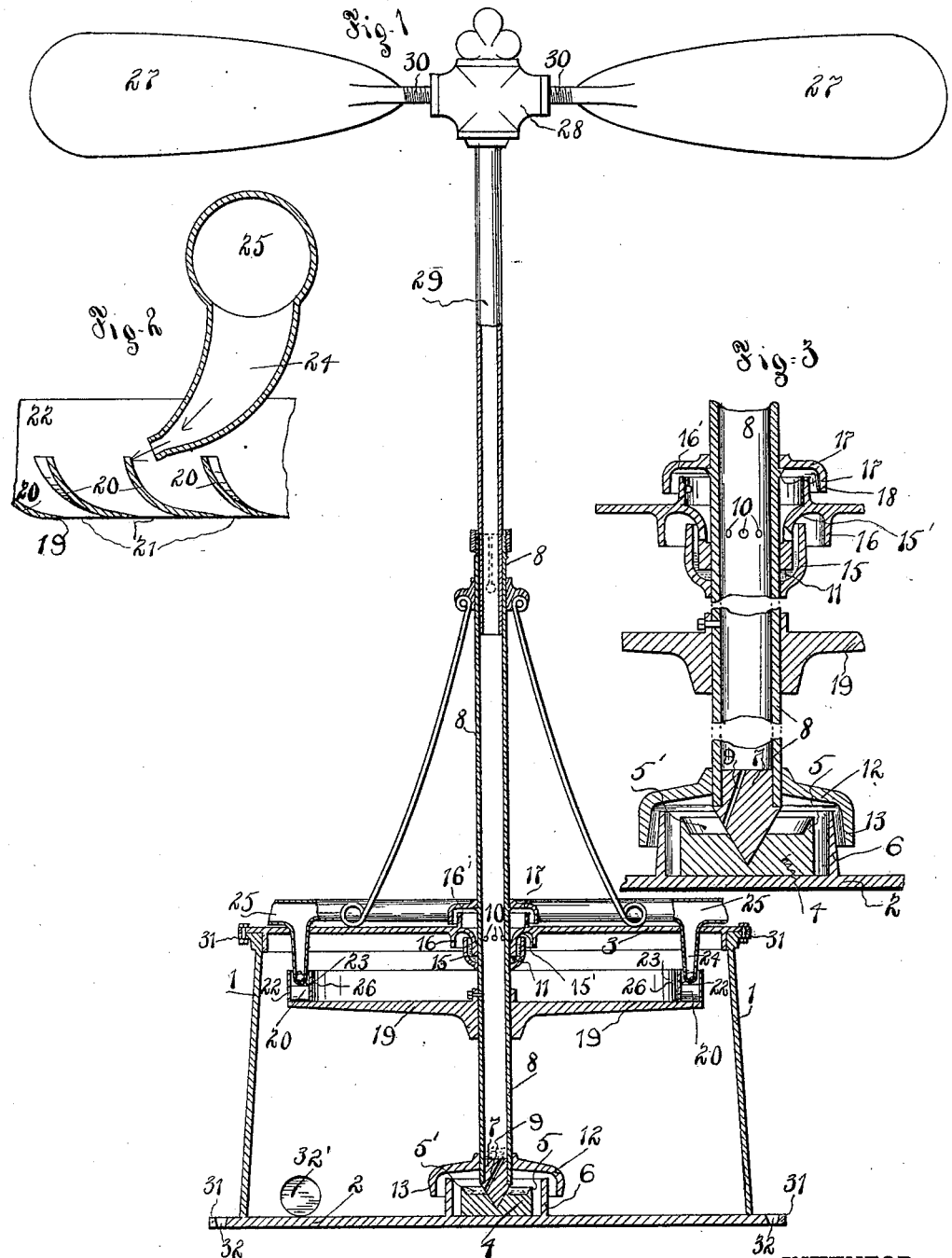
(No Model.)
C. ZEH.
AUTOMATIC FAN.
No. 592,900. Patented Nov. 2, 1897.

CHRISTIAN ZEH, OF PHILADELPHIA, PENNSYLVANIA.

AUTOMATIC FAN.

SPECIFICATION forming part of Letters Patent No. 592,900, dated November 2, 1897.

Application filed March 5, 1897. Serial No. 625,999. (No model.)

*To all whom it may concern:*

Be it known that I, CHRISTIAN ZEH, a subject of the German Emperor, residing at Philadelphia, in the county of Philadelphia and State of Pennsylvania, have invented certain new and useful Improvements in a Combined Ventilating-Fan and Water-Motor; and I do hereby declare the following to be a sufficiently full, clear, and exact description thereof to enable others skilled in the art to make and use the said invention.

This invention relates to fans for ventilating and circulating the air in apartments, and has for its object the furnishing of a convenient and inexpensive fan and water-motor combined therewith susceptible of erection and running with the least skill and attention in situations where there is supply of water under pressure and facilities for discharging waste water.

To this end this invention consists in a construction of casing provided with suitable bearings for a vertical arbor bearing a water-wheel inclosed in the case, and an upward extension of the arbor bearing a hub provided with revolving vanes, and includes means of automatically lubricating the bearings of the arbor and protecting the bearings from dirt or other foreign substances, and also of the combination of the jet-tubes for the admission of water and of a discharge for waste water, so that no other skill than that required to connect the water supply and discharge pipes and to stand the case on a level surface is needful for its proper erection for use.

The construction and operation of this invention is hereinafter particularly described, reference being had to the accompanying drawings, in which—

Figure 1 shows a vertical central section of the apparatus embodying this invention. Fig. 2 shows an enlarged sectional view of a portion of the water-wheel and jet-tube, and Fig. 3 shows an enlarged shortened view of the arbor and its bearings and the portion of the casing adjacent thereto.

Referring to the drawings, 1 represents a water-tight case, preferably of circular form of sides, with a flat bottom 2 and top 3. In the center of the bottom 2 is a step or bearing 4, having a surrounding rim 5 to form an open-topped cup 5' to retain oil in and on the step 4. Beyond the rim 5 is another taller and larger rim 6 to exclude water from the cup 5'.

In the central cavity of the step 4 there is fitted, so as to turn freely therein, the conically-pointed end and plug 7 of the arbor 8. The arbor 8 is made tubular and the pointed end plug 7 fitted therein, so as to turn with it. A perforation 9 through the plug 7 conveys oil or other lubricant liquid from the hollow of the tubular arbor 8 to the step 4. The oil or other lubricant liquid enters the arbor 8 through one or more apertures 10 from a chamber 11, surrounding the upper bearing 15 of the arbor 8. The bottom of the chamber 11 is secured fluid-tight to the arbor 8, and the upper edge of it is above the level of the apertures 10. The chamber 11 has no contact with either the bearing 15 or the cover 3 and acts as an annular oil-reservoir, in which the bearing 15 is submerged. A rim 16, attached to or formed with the cover 3, surrounds the upper part of the chamber 11 without contact therewith and forms a trap of air around the top of the chamber 11 and bearing 15 and excludes water and dirt therefrom.

The bearing 15 is connected or integrally formed with the cover 3 by a conical neck 15', which has a rim 16' at its upper edge, around which the rim 18 of an inverted cup-shaped collar 17, fitted on the arbor, rotates without contact with the rim 16'.

The collar 17 is fitted on the arbor 8, so as to rest on a shoulder 17' on the arbor 8, but sufficiently loose to permit it to be easily raised to pour lubricant fluids into the conical neck 15'.

A cap or inverted cup-shaped collar 12, having a rim 13 surrounding the rim 5 without contact therewith, is fitted upon and turns with the arbor 8 and serves to protect the cup 5' from dirt.

A wheel 19 is secured to and turns the arbor 8 and has curved buckets or vanes 20, as shown in Fig. 2, with narrow intervening discharge-openings 21 arranged between the rims 22 and 23, which rims are considerably higher than the tops of the vanes 20 and serve to confine the water in the buckets 20. One or more nozzles 24, of tapering form, are secured to the cover 3 at such an inclination and direction as to deliver jets of water from the supply-pipe 25 tangentially into the groove 26 between the rims 22 and 23 against the concave sides of the vanes 20. The water escapes through the openings 21 and drops to the bottom of the case 1, whence it is discharged through the pipe 32'. The water thus applied to the wheel 19 rotates it at a velocity suitable for the connected air-vanes 27, which are attached to a hub 28 on an extensible arbor 29, inserted in the upper part of the arbor 8. The air-vanes 27 are angularly adjustable on pivots 30, inserted in the hub 28, as is usual in ventilating-fans.

Lugs 31, attached to the rims of the bottom 2 and top 3 of the case 1 and having apertures 32 therein for the insertion of screws, furnish a facility for securing the case and motor to either the under or upper side of a table, counter, or floor, as the requirements for locating the fan may demand.

The combined motor and fan, as above described, requires a minimum of skill for its erection and of attention in use, is easily adjusted to height of the fan without changing any of its parts, and forms a useful article of manufacture at slight cost as compared with other devices for the same service.

Having described my invention and the operation thereof, what I claim is—

1. A combined ventilating-fan and hydraulic motor, embracing a fluid-tight case, having bearings adapted to support an arbor, rims and caps and oil-chambers arranged to submerge the bearings in a liquid lubricant, as described; a water-motor wheel having concave buckets and rims surrounding said buckets, jet-tubes arranged to supply water thereto, a discharge-pipe, a tubular shaft arranged to convey lubricants to the lower bearing thereof and an extensible upper shaft, and air-vanes, substantially as set forth.

2. In a combined water-motor and ventilating-fan, a supporting-case, a tubular extensible arbor having an oil-conduit in its lower section, a bearing submerged in a lubricant-step at the bottom of said arbor, an upper bearing and a cap surrounding said bearing to hold a lubricant in which said bearing is submerged, combined with cups provided with rims arranged to exclude water and dirt from said bearings, substantially as set forth.

CHRISTIAN ZEH.

Witnesses:
 LOUISA STREET,
 WILLIAM SHEETZ.